(12) United States Patent
Smith

(10) Patent No.: US 9,690,492 B2
(45) Date of Patent: Jun. 27, 2017

(54) RANDOM READ PERFORMANCE OF OPTICAL MEDIA LIBRARY

(71) Applicant: International Business Machines Corporation, Armonk, NY (US)

(72) Inventor: Daniel F. Smith, Felton, CA (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 14/589,053

(22) Filed: Jan. 5, 2015

(65) Prior Publication Data

US 2016/0196072 A1    Jul. 7, 2016

(51) Int. Cl.
*G06F 3/06* (2006.01)

(52) U.S. Cl.
CPC .......... *G06F 3/0611* (2013.01); *G06F 3/0659* (2013.01); *G06F 3/0686* (2013.01); *G06F 2003/0692* (2013.01)

(58) Field of Classification Search
CPC ............. G06F 12/0862; G06F 12/0866; G06F 3/0676; G06F 2212/6024; G06F 3/0607; G06F 3/0674; G06F 3/0686; G06F 3/0659; G06F 3/0611; G06F 3/0677; G06F 3/0631; G06F 3/0689; G06F 2003/0692
See application file for complete search history.

(56) References Cited

U.S. PATENT DOCUMENTS

| | | | |
|---|---|---|---|
| 5,513,156 A * | 4/1996 | Hanaoka | G06F 3/0601 360/98.04 |
| 7,355,939 B2 | 4/2008 | Wu et al. | |
| 7,839,729 B2 | 11/2010 | Kadlec | |
| 8,000,176 B2 | 8/2011 | Bakx | |
| 8,077,566 B2 | 12/2011 | Mahnad | |
| 2004/0145985 A1* | 7/2004 | Osakabe | G11B 7/0062 369/47.53 |
| 2004/0233826 A1 | 11/2004 | Sugano | |
| 2006/0082916 A1* | 4/2006 | Evans | G11B 27/11 360/55 |
| 2006/0239166 A1 | 10/2006 | Yu | |
| 2010/0287142 A1 | 11/2010 | Wesener et al. | |
| 2013/0173850 A1* | 7/2013 | Song | G06F 12/0246 711/103 |

* cited by examiner

*Primary Examiner* — Hashem Farrokh
(74) *Attorney, Agent, or Firm* — Lieberman & Brandsdorfer, LLC

(57) ABSTRACT

Embodiments relate to data storage media, and reading data from the media and writing data to the media. A data structure is provided to identify storage location and/or media parameters. One or more parameters of storage media is pre-loaded and conveyed to an associated media accessor prior to transferring data across the storage media in support of an associated read or write request.

20 Claims, 8 Drawing Sheets

RANDOM READ PERFORMANCE OF OPTICAL MEDIA LIBRARY

BACKGROUND

The present embodiments relate to optical storage on a disc and one or more collections of optical discs in an associated library. More specifically, the embodiments relates to collections of discs in a library and modification to an associated optical drive to improve performance.

In computing, an optical disc drive (ODD) is a disc drive that uses laser light or electromagnetic waves within or near the visible light spectrum as part of the process of reading or writing data to or from optical discs, also referred to herein as an optical medium. The ODD uses a laser to read and write data. The laser emits an electromagnetic wave with a specific wavelength within or near the visible light spectrum. Different types of discs require different wavelengths. An optical drive that can work with multiple types of discs will contain multiple lasers. The mechanism to read and write data consists of a laser, a lens to guide a laser beam, and photodiodes to detect the light reflection from the disc.

It is understood and recognized that each disc may contain specific optical properties for reading and writing data to the media, and the laser within the ODD may need to be adjusted based on these optical properties. In addition, there will be metadata necessary to recover data stored on the disc that the ODD must read from the disc prior to the operation. These metadata are seldom updated once a disc is written. Accordingly, there is a need to mitigate any metadata delays to enable the ODD to efficiently support read and write requests.

SUMMARY

The embodiments include a method, computer program product, and system for enhancing performance associated with reading data from an optical medium within an optical media library.

A method, computer program product, and system are provided for managing pre-load parameters of media. One or more media accessors are configured in communication with a data interface for transferring data in support of a read or write request. More specifically, characteristic parameters of a storage medium and data are pre-loaded and conveyed from a shared location to the media accessor(s) prior to transferring data across storage media.

Other features and advantages of this embodiment will become apparent from the following detailed description of the presently preferred embodiment(s) of the embodiment, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the present embodiment(s), as generally described and illustrated in the Figures herein, may be arranged and designed in a wide variety of different configurations. Thus, the following detailed description of the embodiments of the apparatus, system, and method, as presented in the Figures, is not intended to limit the scope, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Figure 1:
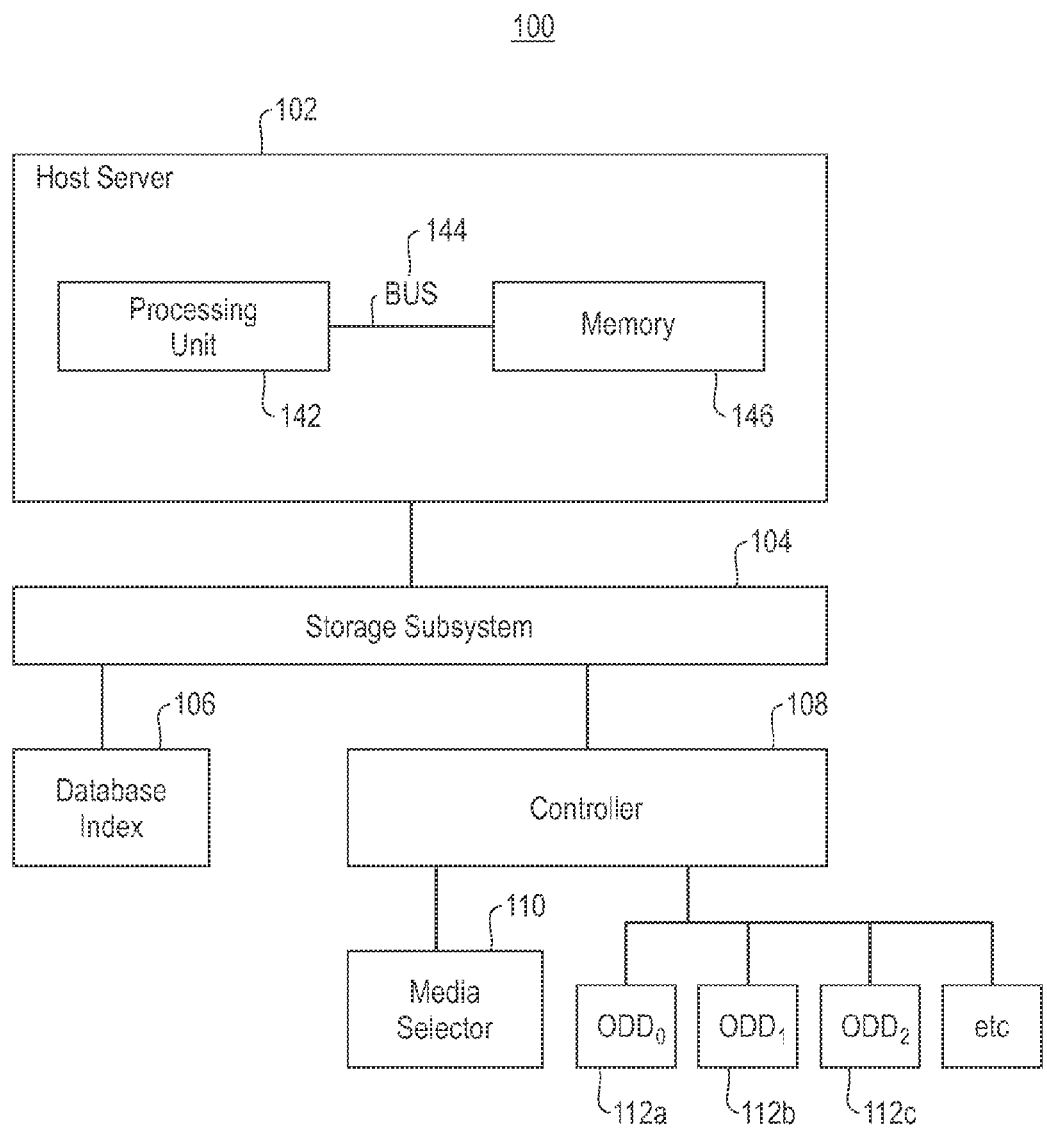
FIG. 1 depicts a block diagram illustrating a system overview to support an ODD, and specifically to support reading data from an optical medium and writing data to the optical medium.

With reference to FIG. 1, a block diagram (100) is provided illustrating a system overview to support an ODD, and specifically to support reading data from an optical medium and writing data to the optical medium. As shown, a host server (102) requests to read a data block, also referred to herein as a read request, identified by a logical block address from a storage subsystem (104). The host server (102) is provided with a processing unit (142) in communication with memory (146) across a bus (144). A database index (106) is referred to by the subsystem (104) to find the location of the data block. In the example shown herein, there is a single database index (106) for a host system (102). In one embodiment, there may be a plurality of host systems (102) with a shared database index (106). Similarly, in another embodiment, the database index (106) may be embedded in the storage subsystem (104). In another embodiment, the database index (106) may be separate from both the host system (102) and the storage subsystem (104), with the index (106) embedded in a group of shared resources, e.g. cloud based resource. Regardless of the location, the database index (106) functions to store a set of parameters for an optical disc, or a plurality of optical discs. In one embodiment, the database index (106) resides on fast media to reduce the latency in reading associated disc data. For example, in the embodiment where the database index (106) is embedded in the storage subsystem (104), the index may reside on flash memory or DRAM, and in the embodiment where the database index (106) is embedded in the host system, the database index (106) may reside on cache, RAM, or local persistent memory. Accordingly, the database index contains pre-load parameters of one or more optical discs in an associated optical disc library.

The database index (106) includes data pertaining to the location of the database associated with the read request. If the read data are cached, then the associated data is returned from cache. However, if the requested data is not cached, then the read request together with the location data is passed to a controller (108) for the associated optical disc library. The controller (108) coordinates with an associated media selector (110) to load a designated media from the library into an ODD (112a)-(112c). The data block associated with the read request is retrieved using the ODD reference logical block address. The controller (108) consults the index (106) and coordinates loading of the media to support the read request and unloading of the media at the conclusion of the read request based on data retained in the index (106). More specifically, the controller (108) identifies the medium in support of the request, where the identity of the medium can be determined algorithmically with the support of the parameter database. The controller (108) is able to manage selection and delivery of the identified media from the library to the media accessors. To read data from the disc, an ODD would typically run a series of piecewise tests to determine, internally, the parameters necessary to translate disk LBA to disc PBA at a suitable performance level. Most of those tests can be skipped when parameters data are available over the interface from the controller (108). Accordingly, each media in support of a read request may have distinct or overlapping parameters that require coordination with the ODD to enable and support reading and writing one or more data blocks associated with the media.

As disclosed herein, a media accessor is an ODD or similar device. A data interface may be in the form of a SATA bus, which is a computer bus interface that connects host bus adapters to mass storage devices, such as hard disk drives and optical drives. Parameters as described herein are conveyed to the ODD over the interface, rather than derived from the media. More specifically, the parameters and associated information are communicated across the data interface.

Figure 2:
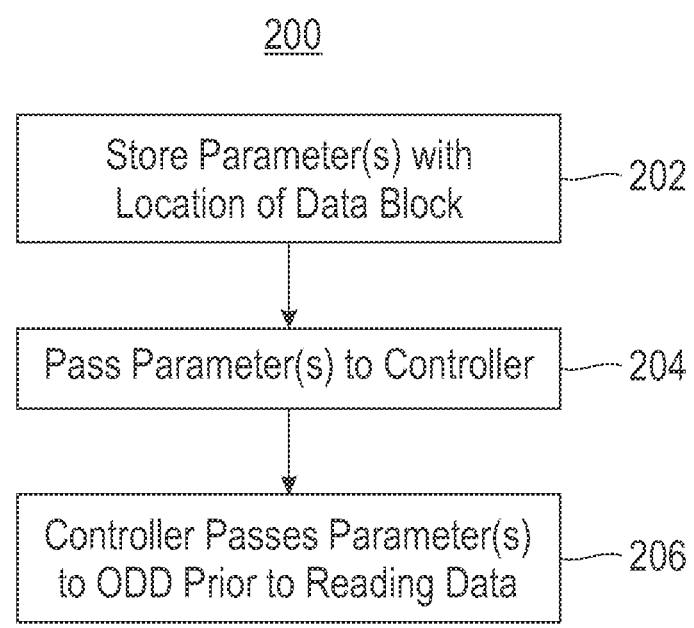
FIG. 2 depicts a flow chart illustrating a process for supporting a read request when the associated read data is not cached.

Obtaining the disc dependent parameters described above with respect to FIG. 1 and adjusting the settings of the ODD to support the media parameters, creates latency with communication between the media and the ODD. Referring to FIG. 2, a flow chart (200) is provided illustrating a process for supporting a read request when the associated read data is not cached. The process shown herein eliminates converting an ODD reference logical block address (LBA) to a physical block address (PBA). One or more additional parameters are stored with the location of the data block (202). These parameters are passed to the controller (204) with the location of the data block. When the controller has selected an ODD, the controller passes these parameters to the ODD prior to reading data to support the read request (206). The following table, Table 1, lists example parameters bound to the logical block address that may be stored with the location of the data block:

TABLE 1

Medium number/identifier
Medium optical disc drive-referenced logical block address or physical block address Every disc has a table of bad data blocks. A LBA to PBA conversion table is stored on disc containing a list of media errors. In one embodiment, once the table is written it does not change significantly. The following table, Table 2, lists example parameters that are bound to the medium during formatting; the medium is also referred to herein as the optical disc:

TABLE 2

Preferring ODD serial number or class
Laser focused calibration for layers
Medium type (physical properties, e.g. layer depths)
Medium block table for LBA to PBA conversion, e.g. bad blocks
Medium maximum rotational velocity
Environmental conditions when parameters were determined
ODD serial number when parameters were determined
Encryption data
Linked media numbers/identifier for error recovery
Free/used space information
Disc location Each optical disc stores data in one or more layers. For example, in one embodiment, the disc may contain 4. With respect to the block table for LBA to PBA conversion, the table is created while the data are written. Accordingly, each disc media has specific parameters that may be unique to the disc and may require adjustment by the ODD to support an associated request.

As shown above, each disc or medium, has media associated parameters that pertain to data stored on the media or data to be stored on the media. In an embodiment where the medium is an optical disc, the medium is read by an associated ODD. Similar to the media, each ODD may be configured with specific parameters, such as laser specific parameters, which may be configurable to read and write data to different optical media. The following table, Table 3, lists example parameters that are bound to the ODD:

TABLE 3

Laser power calibration
Laser focus calibration offset
ODD metrics for media selector (slot or tray deposition, position)
Performance measurements, e.g. error rates and patterns
Port location Accordingly, as shown herein, similar to the optical media, the ODD has configurable parameters.

To mitigate latency between the ODD and the optical media, the parameters shown in Table 1, Table 2, and Table 3 are passed to the ODD prior to reading data stored on optical medium. It is noted that Tables 1, 2, and 3 are exemplary and not exhaustive. Some of the parameters listed in the above-illustrated tables can be determined by the controller (108) and the storage subsystem (104). However, most of these parameters can only be found by interrogating the ODDs (112a), (112b), and (112c). More specifically, the controller (108) pre-loads the parameters for the storage media based on interrogation of the ODDs. This interrogation requires an extension to both the ODD communication protocol and internal firmware found in the ODD to enable retrieval and pre-loading of these parameters.

Figure 3:
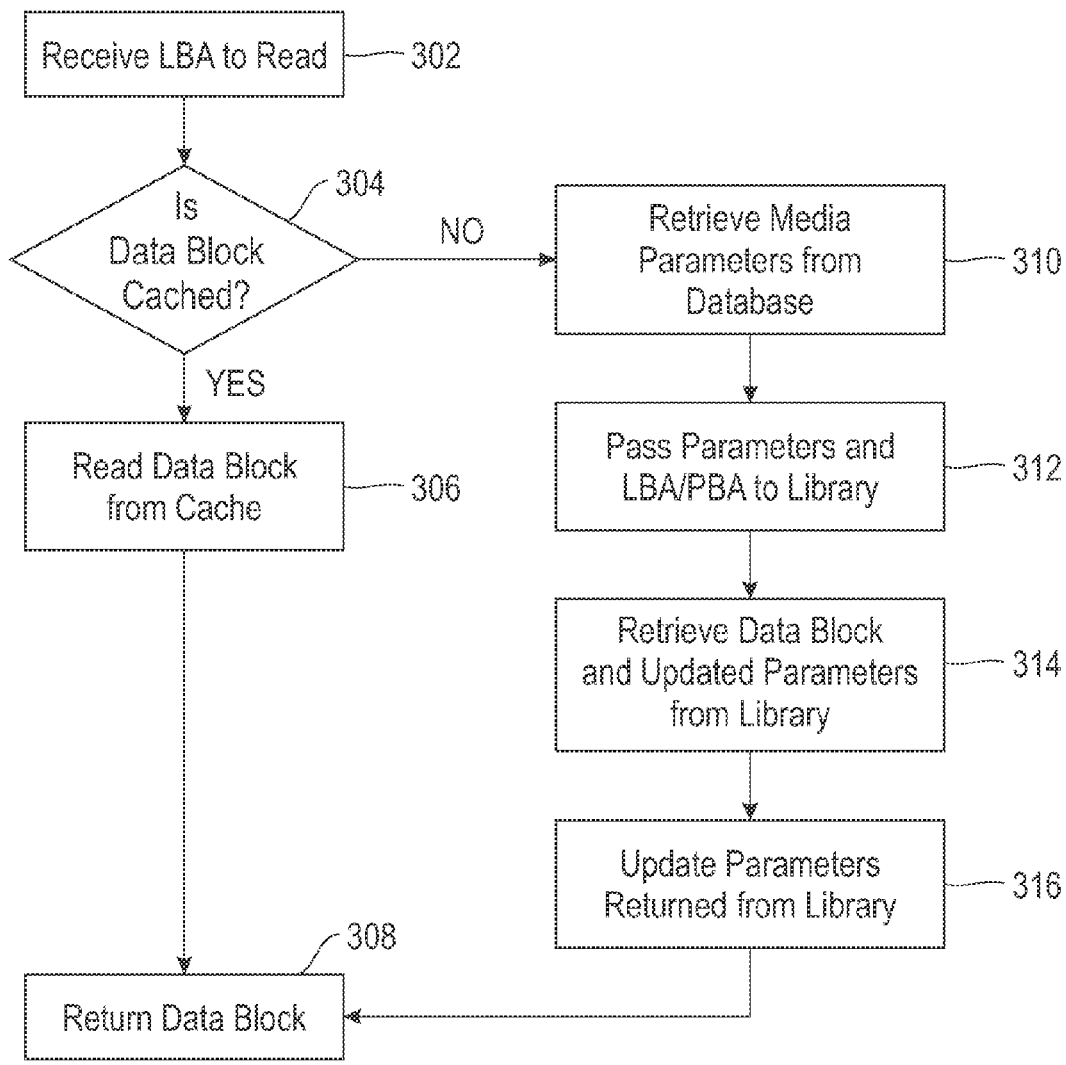
FIG. 3 depicts a flow chart illustrating a sequence of events to read a data block.

Referring to FIG. 3, a flow chart (300) is provided illustrating a sequence of events to read a data block from the perspective of the storage subsystem. The logical block address to read is received (302). It is then determined if the associated data block is cached (304). As indicated above, cached data is read from the cache, and as such, does not require pre-loading of optical media parameters. If the data block is cached, the data block is read from the cache (306) and returned (308). However, if it is determined that the data block is not cached, the media parameters are retrieved from a database (310). In one embodiment, the database is stored in a shared resource operating in the cloud. Once the parameters are retrieved, including the LBA and PBA, they are passed to the controller (312). The data block(s) needed to support the read request are retrieved, together with the updated parameters from the controller (314). Thereafter, the parameters returned from the controller are updated to the database (316), and the data block is read and returned (308). Accordingly, the process shown herein demonstrates a sequence of events for reading a data block from the perspective of the subsystem.

Figure 4:
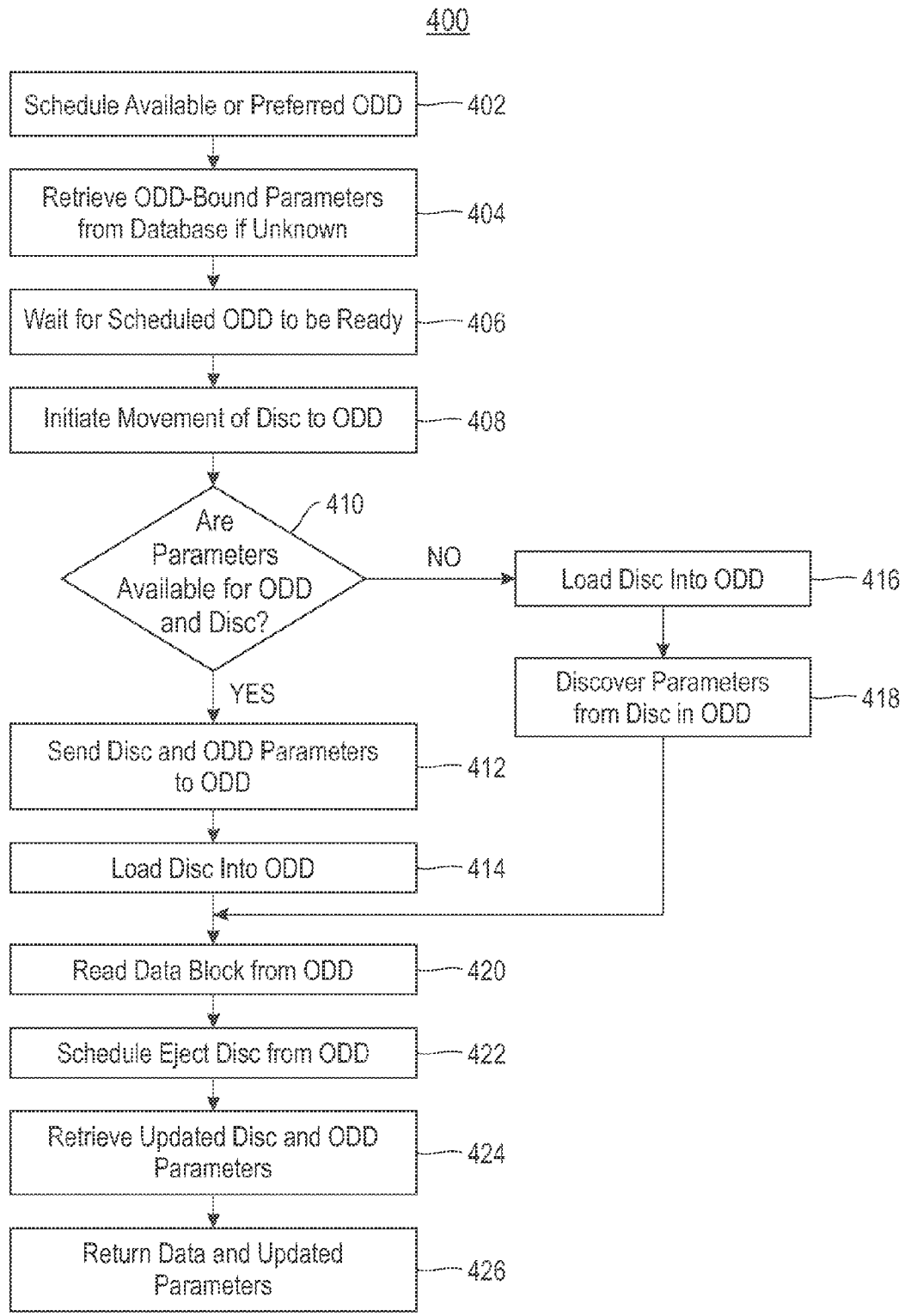
FIG. 4 depicts a flow chart illustrating a sequence of events for the controller to read a data block.

As shown in FIG. 3, the LBA and PBA parameters are passed to the controller (312). Referring to FIG. 4, a flow chart (400) is provided illustrating a sequence of events for the controller (108) to read a data block. The process is initiated with scheduling an available or preferred ODD to support the read request (402). Thereafter, the ODD bound parameters are retrieved from the database, if they are not otherwise known by the controller (404). Such parameters include, but are not limited to, parameters that may be subject to change for that specific ODD, such as a laser power offset for the disc drive laser. Following step (404), the system waits for the scheduled ODD to be ready (406), after which movement of the optical media is initiated to the ODD (408). It is then determined if the parameters for the ODD and the optical media are available (410). If the parameters are available, the optical media and the parameters are sent to the ODD (412) and the optical media is loaded into the ODD (414). However, if the parameters are not available, the process proceeds to step (416) to load the optical media into the ODD followed by discovering the parameters from the optical disc in the ODD (418). Accordingly, as shown herein, the parameters may be sent to the selected ODD prior to loading the optical media.

Regardless of the timing associated with loading the parameters, data block(s) to support the read request is read from the ODD (420), and after the read request is complete, scheduling of ejection of the optical media from the ODD takes place (422). If the media parameters have changed, any updated parameters are retrieved for updating with the database (424), followed by returning the data and updated parameters (426) to step (314). As shown at step (426), when a disc is read, the parameters can be updated with current versions by retrieving them from the ODD prior to ejecting the media. Performance is gained and enhanced by skipping step (418). In one embodiment, the steps of parameter retrieval and updating are fast and efficient in comparison to discovering the parameters after the optical media has been loaded in the ODD. Accordingly, the process shown herein illustrates the aspect of retrieving media parameters and sending the parameters to the ODD and loading the optical medium to support the read request, as well as updating any of the parameters in the process of supporting the read request.

The retrieval and pre-loading of the parameters in the manner shown in FIG. 4 may be determined by the controller (108) and the storage subsystem (104). However, in one embodiment, these parameters are obtained by interrogating the ODD. This interrogation may take the form of an extension to an ODD communication protocol and internal firmware found in the ODD (112).

The process described herein pertains to support of a read request using an optical medium and an associated ODD. Data may be written to the optical medium. In one embodiment, writing of optical class libraries is a long sequential burst to the medium, making the value of parameter pre-loading marginal. When a disc is written, a full set of the parameters can be retrieved from the ODD prior to ejecting the medium from the drive.

Figure 5:
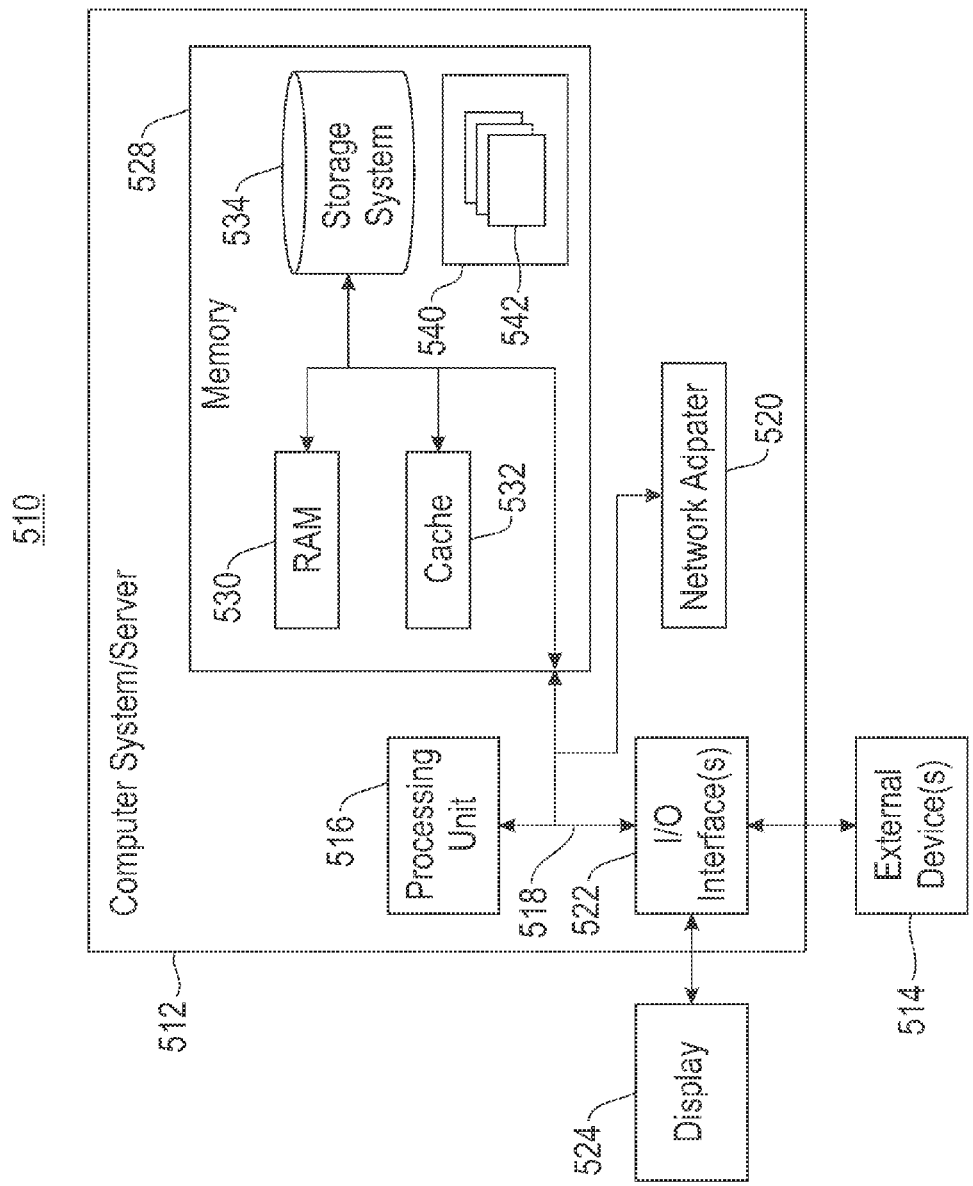
FIG. 5 depicts a cloud computing node according to one embodiment.

As articulated herein, the media parameters that are retrieved, see step (310), may be stored in a shared pool of configurable resources, i.e. a cloud based system. A cloud computing environment is service oriented with a focus on statelessness, low coupling, modularity, and semantic interoperability. At the heart of cloud computing is an infrastructure comprising a network of interconnected nodes. Referring now to FIG. 5, a schematic of an example of a cloud computing node is shown. Cloud computing node (510) is only one example of a suitable cloud computing node and is not intended to suggest any limitation as to the scope of use or functionality of embodiments described herein. Regardless, cloud computing node (510) is capable of being implemented and/or performing any of the functionality set forth hereinabove. In cloud computing node (510) there is a computer system/server (512), which is operational with numerous other general purpose or special purpose computing system environments or configurations. Examples of well-known computing systems, environments, and/or configurations that may be suitable for use with computer system/server (512) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (512) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (512) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server (512) in cloud computing node (510) is shown in the form of a general-purpose computing device. The components of computer system/server (512) may include, but are not limited to, one or more processors or processing units (516), a system memory (528), and a bus (518) that couples various system components including system memory (528) to processor (516). Bus (518) represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, Video Electronics Standards Association (VESA) local bus, and a Peripheral Component Interconnects (PCI) bus. A computer system/server (512) typically includes a variety of computer system readable media. Such media may be any available media that is accessible by a computer system/server (512), and it includes both volatile and non-volatile media, and removable and non-removable media.

System memory (528) can include computer system readable media in the form of volatile memory, such as random access memory (RAM) (530) and/or cache memory (532). Computer system/server (512) may further include other removable/non-removable, volatile/non-volatile computer system storage media. By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus (518) by one or more data media interfaces. As will be further depicted and described below, memory (528) may include at least one program product having a set (e.g., at least one) of program modules that are configured to carry out the functions of the described embodiments.

Program/utility (540), having a set (at least one) of program modules (542), may be stored in memory (528) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments as described herein.

Computer system/server (512) may also communicate with one or more external devices (514), such as a keyboard, a pointing device, a display (524), etc.; one or more devices that enable a user to interact with computer system/server (512); and/or any devices (e.g., network card, modem, etc.) that enable computer system/server (512) to communicate with one or more other computing devices. Such communication can occur via Input/Output (I/O) interfaces (522). Still yet, computer system/server (512) can communicate with one or more networks such as a local area network (LAN), a general wide area network (WAN), and/or a public network (e.g., the Internet) via network adapter (520). As depicted, network adapter (520) communicates with the other components of computer system/server (512) via bus (518). It should be understood that although not shown, other hardware and/or software components could be used in conjunction with computer system/server (512). Examples, include, but are not limited to: microcode, device drivers, redundant processing units, external disk drive arrays, RAID systems, tape drives, and data archival storage systems, etc.

Figure 6:
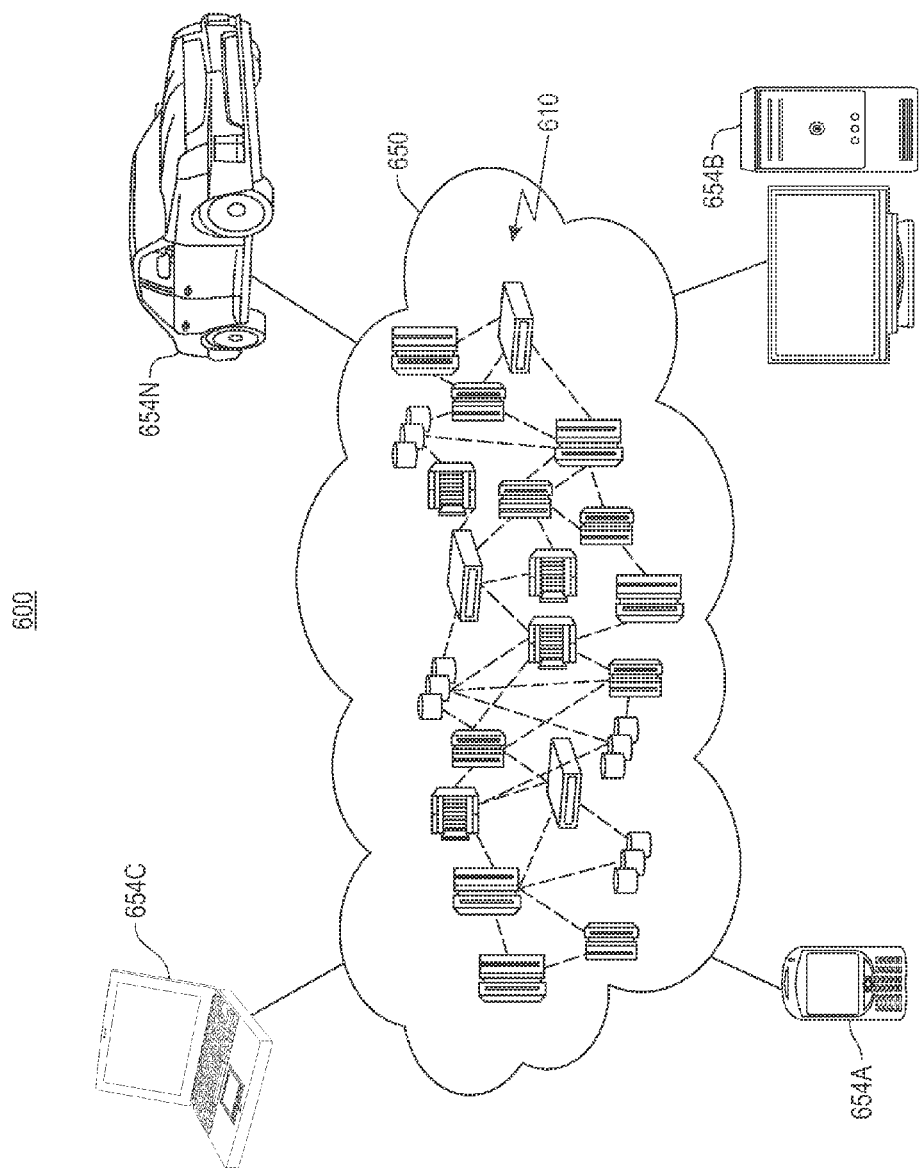
FIG. 6 depicts a cloud computing environment according to one embodiment.

Referring now to FIG. 6, illustrative cloud computing environment (650) is depicted. As shown, cloud computing environment (650) comprises one or more cloud computing nodes (610) with which local computing devices used by cloud consumers, such as, for example, personal digital assistant (PDA) or cellular telephone (654A), desktop computer (654B), laptop computer (654C), and/or automobile computer system (654N) may communicate. Nodes (610) may communicate with one another. They may be grouped (not shown) physically or virtually, in one or more networks, such as Private, Community, Public, or Hybrid clouds as described hereinabove, or a combination thereof. This allows cloud computing environment (650) to offer infrastructure, platforms and/or software as services for which a cloud consumer does not need to maintain resources on a local computing device. It is understood that the types of computing devices (654A)-(654N) shown in FIG. 6 are intended to be illustrative only and that computing nodes (610) and cloud computing environment (650) can communicate with any type of computerized device over any type of network and/or network addressable connection (e.g., using a web browser).

Figure 7:
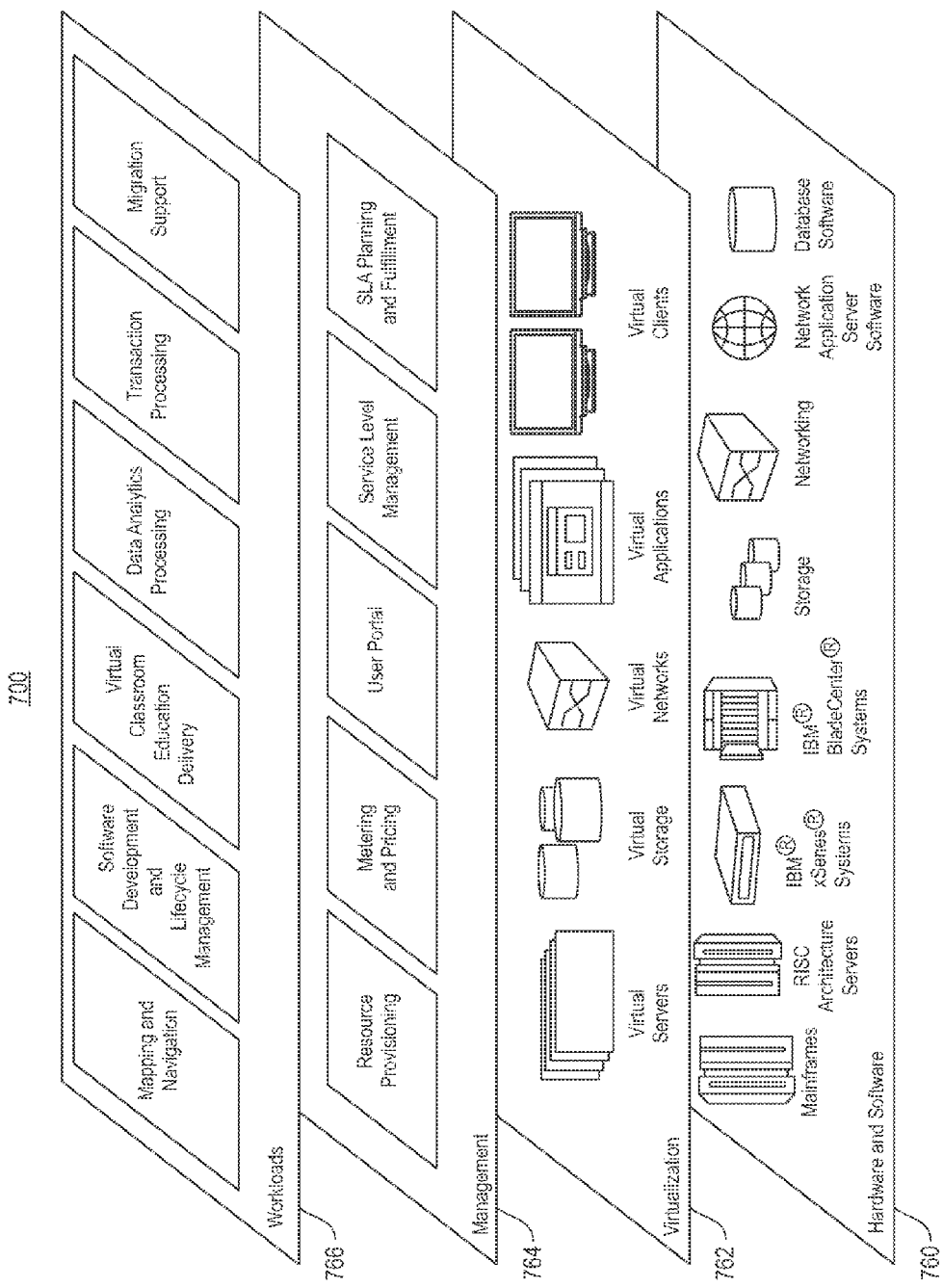
FIG. 7 depicts abstraction model layers according to one embodiment.

Referring now to FIG. 7, a set of functional abstraction layers provided by cloud computing environment (650) is shown. It should be understood in advance that the components, layers, and functions shown in FIG. 7 are intended to be illustrative only and embodiments are not limited thereto. As depicted, the following layers and corresponding functions are provided: hardware and software layer (760), virtualization layer (762), management layer (764), and workload layer (766). The hardware and software layer (760) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (762) provides an abstraction layer from which the following examples of virtual entities may be provided: virtual servers, virtual storage, virtual networks, including virtual private networks, virtual applications and operating systems, and virtual clients.

In one example, management layer (764) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources that are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (766) provides examples of functionality for which the cloud computing environment may be utilized. An example of workloads and functions which may be provided from this layer includes, but is not limited to, organization and management of data objects within the cloud computing environment. In the shared pool of configurable computer resources described herein, hereinafter referred to as a cloud computing environment, files may be shared among users within multiple data centers, also referred to herein as data sites. A series of mechanisms are provided within the shared pool to provide organization and management of data storage. A computer storage system provided within the shared pool of resources contains multiple levels known as storage tiers. Each storage tier is arranged within a hierarchy and is assigned a different role within the hierarchy. It should be understood that this hierarchically organized storage system maintains a flexible tier definition, such that tiers can be managed as a singleton on every node or tiers can be managed globally across all, or a subset of, the nodes in the system.

The system described above in FIG. 1 has been labeled with tools in the form of a controller (108), a database of parameters (106), and a media selector (110). The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments. One skilled in the relevant art will recognize, however, that the embodiment(s) can be practiced without one or more of the specific details, or with other methods, components, materials, etc. In other instances, well-known structures, materials, or operations are not shown or described in detail to avoid obscuring aspects of the embodiment(s).

Figure 8:
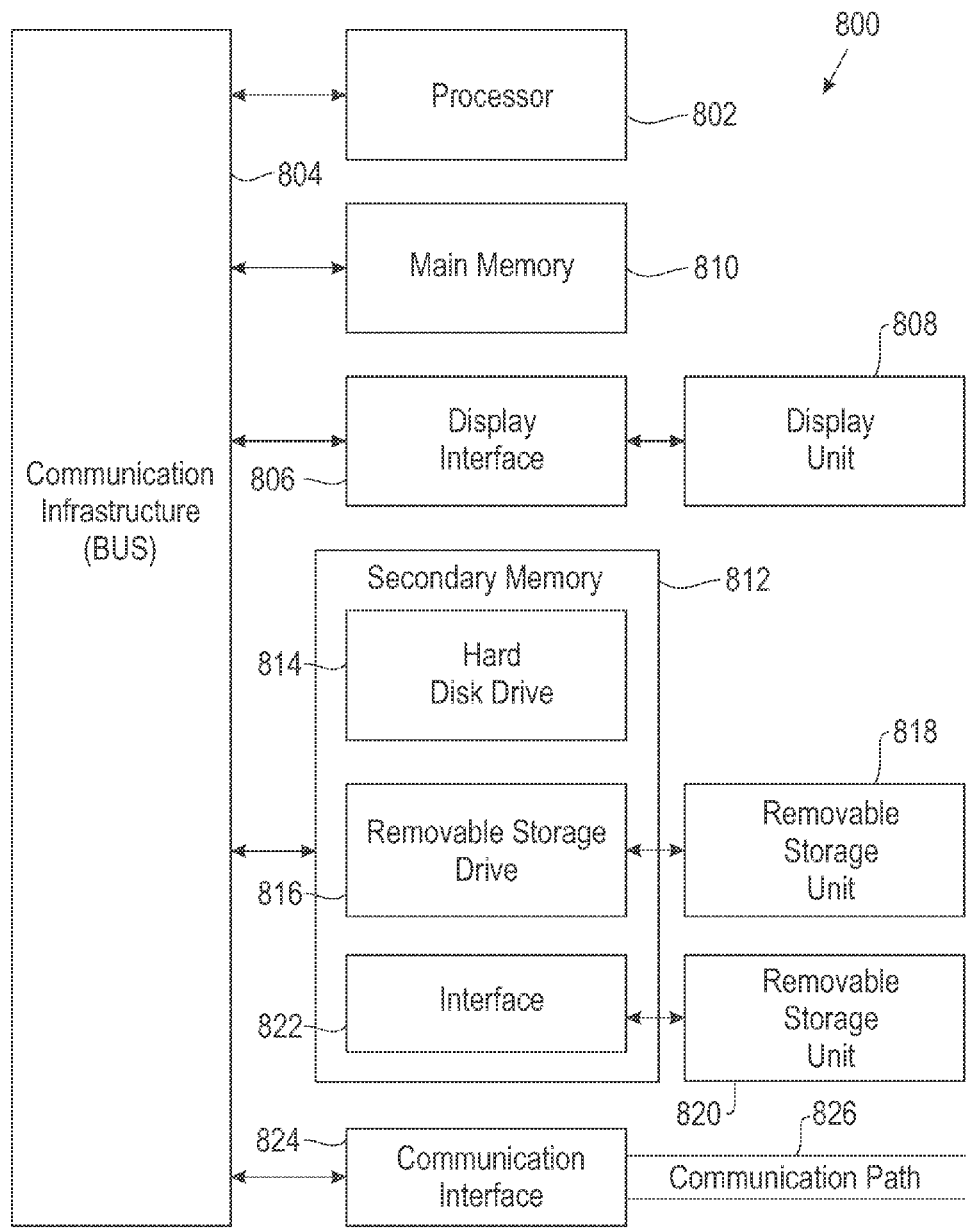
FIG. 8 depicts a block diagram illustrating a system with tools to support improved read performance of media from a media library.

Referring now to the block diagram of FIG. 8, additional details are now described with respect to implementing an embodiment. The computer system includes one or more processors, such as a processor (802). The processor (802) is connected to a communication infrastructure (804) (e.g., a communications bus, cross-over bar, or network).

The computer system can include a display interface (806) that forwards graphics, text, and other data from the communication infrastructure (804) (or from a frame buffer not shown) for display on a display unit (808). The computer system also includes a main memory (810), preferably random access memory (RAM), and may also include a secondary memory (812). The secondary memory (812) may include, for example, a hard disk drive (814) and/or a removable storage drive (816), representing, for example, a floppy disk drive, a magnetic tape drive, or an optical disk drive. The removable storage drive (816) reads from and/or writes to a removable storage unit (818) in a manner well known to those having ordinary skill in the art. Removable storage unit (818) represents, for example, a floppy disk, a compact disc, a magnetic tape, or an optical disk, etc., which is read by and written to by removable storage drive (816).

In alternative embodiments, the secondary memory (812) may include other similar means for allowing computer programs or other instructions to be loaded into the computer system. Such means may include, for example, a removable storage unit (820) and an interface (822). Examples of such means may include a program package and package interface (such as that found in video game devices), a removable memory chip (such as an EPROM, or PROM) and associated socket, and other removable storage units (820) and interfaces (822) which allow software and data to be transferred from the removable storage unit (820) to the computer system.

The computer system may also include a communications interface (824). Communications interface (824) allows software and data to be transferred between the computer system and external devices. Examples of communications interface (824) may include a modem, a network interface (such as an Ethernet card), a communications port, or a PCMCIA slot and card, etc. Software and data transferred via communications interface (824) is in the form of signals which may be, for example, electronic, electromagnetic, optical, or other signals capable of being received by communications interface (824). These signals are provided to communications interface (824) via a communications path (i.e., channel) (826). This communications path (826) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (810) and secondary memory (812), removable storage drive (816), and a hard disk installed in hard disk drive (814).

Computer programs (also called computer control logic) are stored in main memory (810) and/or secondary memory (812). Computer programs may also be received via a communication interface (824). Such computer programs, when run, enable the computer system to perform the features of the present embodiment(s) as discussed herein. In particular, the computer programs, when run, enable the processor (802) to perform the features of the computer system. Accordingly, such computer programs represent controllers of the computer system.

The present embodiment(s) may be a system, a method, and/or a computer program product. The computer program product may include a computer readable storage medium (or media) having computer readable program instructions thereon for causing a processor to carry out aspects of the present embodiment(s).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiment(s) has been presented for purposes of illustration and description, but is not intended to be exhaustive or limited in the form disclosed. Many modifications and variations will be apparent to those of ordinary skill in the art without departing from the scope and spirit of the embodiment(s). The embodiment was chosen and described in order to best explain the principles of the embodiment(s) and the practical application, and to enable others of ordinary skill in the art to understand the various embodiments with various modifications as are suited to the particular use contemplated. The implementation of the index in a shared location enables media parameters to be obtained from a common location. At the same time, the modification to the ODD, including the extension to the communication protocol and modification of the ODD firmware support the pre-loading of the parameters stored in the shared location. Accordingly, the maintenance and accessibility of the index together with the modification to the ODD supports and enables the pre-loading of the optical media parameters to the ODD to support read and write requests.

Alternative Embodiment

It will be appreciated that, although specific embodiments have been described herein for purposes of illustration, various modifications may be made without departing from the spirit and scope. In particular, the embodiments disclosed herein may be applied to any removable storage medium where startup performance is a concern. Such mediums may include, but are not limited to, hard disk drives, tape, or flash memory. With respect to hard disk drives, the embodiments may be applicable where power off is similar to no media load, with respect to tape, the embodiments may be applicable where the metrics database is integrated into a cartridge, and with respect to flash memory, the embodiments may be applicable where external metrics may be updated based on environmental conditions. Accordingly, the scope of protection of the embodiments is limited only by the following claims and their equivalents.

We claim:

1. A method comprising:
configuring at least one disc drive in communication with a data interface for transferring data;
pre-loading a medium dependent parameter to the at least one configured drive, the pre-loading including:
selecting the at least one configured drive;
identifying a storage medium to be received by the selected drive;
consulting a shared location for the identified storage medium including determining at least one medium dependent parameter associated with the selected drive, wherein the at least one medium dependent parameter supports reading or writing data to the storage medium; and
conveying and loading the at least one medium dependent parameter from a shared location to the selected drive over the interface prior to reading data stored on the identified storage medium, wherein the selected drive utilizes the medium dependent parameter to adjust at least one setting of the selected drive in support of a data request, wherein the at least one setting is selected from the group consisting of: a read setting and a write setting; and
the selected drive performing the data request.

2. The method of claim 1, further comprising selecting and delivering the identified storage medium from a library to the selected drive.

3. The method of claim 2, further comprising;
retrieving at least one medium dependent parameter from the selected drive through the interface;
comparing the retrieved parameter to a corresponding medium dependent parameter in the shared location; and
changing the corresponding parameter to the retrieved parameter if the retrieved parameter does not match the corresponding parameter, and not changing the corresponding parameter if the retrieved parameter does match the corresponding parameter.

4. The method of claim 2, wherein the medium dependent parameter is selected from the group consisting of: an environmental condition, encryption data, medium maximum rotational velocity, laser power calibration, and laser focus calibration.

5. The method of claim 1, wherein the at least one medium dependent parameter includes type and format of the storage medium.

6. The method of claim 1, wherein the at least one medium dependent parameter includes a mapping of logical block addresses to physical block addresses.

7. The method of claim 1, further comprising discovering the at least one medium dependent parameter from data contained in the storage medium, and constructing a database in the shared location, the database including the discovered at least one medium dependent parameter.

8. A non-transitory computer program product for reading and writing data to a storage medium, the computer program product comprising a computer readable storage medium having program code embodied therewith, the program code executable by a processing unit to:
configure at least one disc drive in communication with a data interface for transferring data;
select one configured drive;
identify a storage medium to be received by the selected drive;
consult a shared location for the identified storage medium including determine at least one medium dependent parameter associated with the selected drive, wherein the at least one medium dependent parameter supports reading or a writing data to the storage medium; and
convey and load the at least one medium dependent parameters from a shared location to the selected drive over the interface prior to reading data stored on the identified storage medium, wherein the selected drive utilizes the medium dependent parameter to adjust at least one setting of the selected drive in support of a data request, wherein the at least one setting is selected from the group consisting of: a read setting and a write setting; and
the selected drive performing the data request.

9. The computer program product of claim 8, further comprising program code to select and deliver the identified storage medium from a library to the selected drive.

10. The computer program product of claim 9, further comprising program code to:
retrieve at least one medium dependent parameter from the selected drive through the interface;
compare the retrieved parameter to a corresponding parameter medium dependent parameter in the shared location; and
change the corresponding parameter to the retrieved parameter if the retrieved parameter does not match the corresponding parameter, and not change the corresponding parameter if the retrieved parameter does match the corresponding parameter.

11. The computer program product of claim 9, wherein the selected drive is an optical disc drive, and the storage medium is an optical disc.

12. The computer program product of claim 8, wherein the at least one medium dependent parameter includes type and format of the storage medium.

13. The computer program product of claim 8, wherein the at least one medium dependent parameter includes a mapping of logical block addresses to physical block addresses.

14. The computer program product of claim 8, further comprising program code to discover the at least one medium dependent parameter from data contained in the storage medium, and construct a database in the shared location, the database including the discovered at least one medium dependent parameter.

15. A computer system comprising:
a processing unit operatively coupled to memory;
a controller in communication with the processing unit to read and write data;
at least one disk drive;
the controller to select one drive;
the controller to identify a storage medium to be received by the selected drive;
the at least one disk drive in communication with a data interface for transferring data in support of reading data from the storage medium and writing data to the storage medium;
the controller to consult a shared location for the identified storage medium including determine at least one medium dependent parameter associated with the selected drive; and
the controller to convey and load the at least one medium dependent parameter from a shared location to the selected drive over the interface prior to reading data stored on the identified storage medium, wherein the selected drive utilizes the medium dependent parameter to adjust at least one setting of the selected drive in support of a data request, wherein the at least one setting is selected from the group consisting of: a read setting and a write setting; and
the selected drive performing the data request.

16. The system of claim 15, further comprising the controller to select and deliver the identified storage medium from an optical media library to the selected drive.

17. The system of claim 16, further comprising the controller to update the parameters, including the controller to
retrieve at least one medium dependent parameter from the selected drive through the interface;
compare the retrieved parameter to a corresponding medium dependent parameter in the shared location; and
change the corresponding parameter to the retrieved parameter if the retrieved parameter does not match the corresponding parameter and not change the corresponding parameter if the retrieved parameter does match the corresponding parameter.

18. The system of claim 15, further comprising the controller to discover the at least one medium dependent parameter from data contained in the storage medium, and construct a database in a shared location, the database including the discovered at least one medium dependent parameters.

19. The system of claim 15, wherein the selected drive is an optical disk drive, and the storage medium is an optical disc.

20. The system of claim 15, wherein the at least one medium dependent parameter includes a mapping of logical block addresses to physical block addresses.

* * * * *